April 12, 1932.  E. F. KAISER  1,853,359
CENTRIFUGAL LOCKING MEANS
Filed Dec. 17, 1928
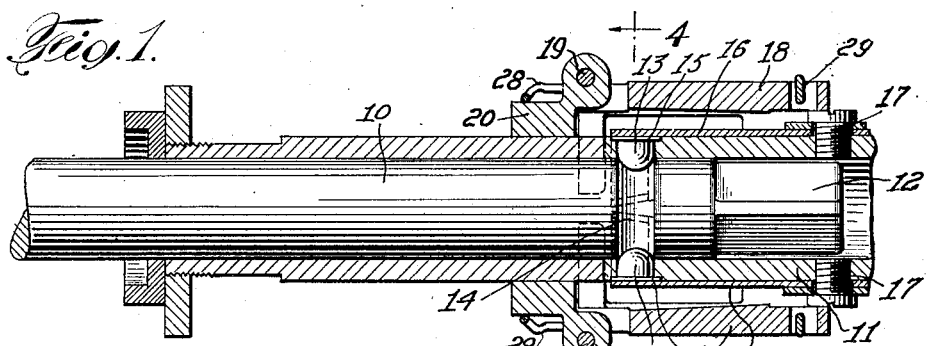
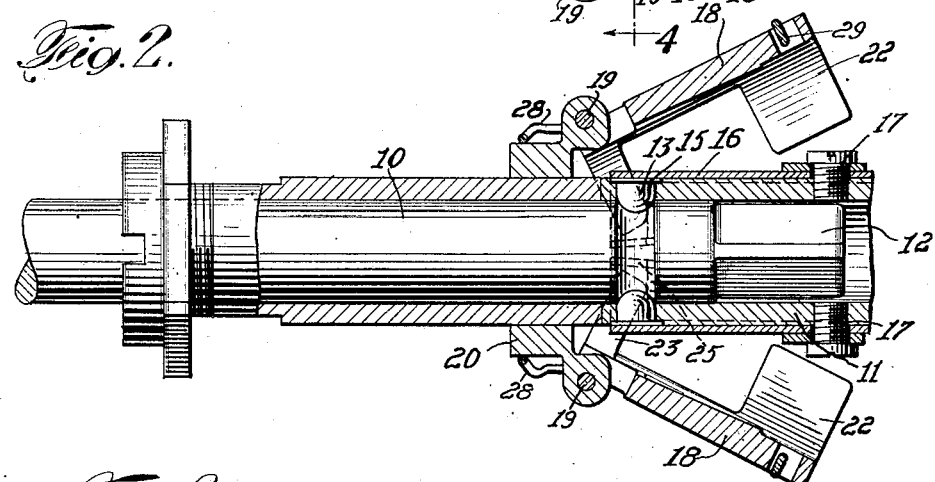
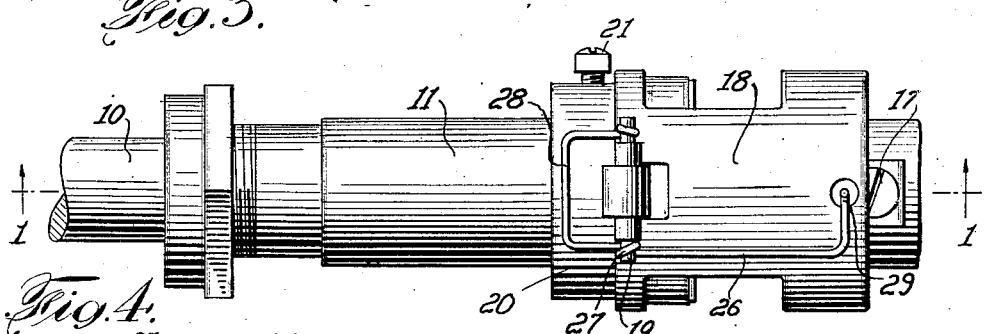
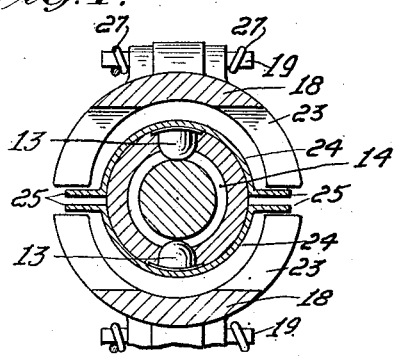
Inventor
Ernest F. Kaiser
By his Attorneys
Hoguet & Neary Patented Apr. 12, 1932

1,853,359

UNITED STATES PATENT OFFICE

ERNEST F. KAISER, OF NEW YORK, N. Y.

CENTRIFUGAL LOCKING MEANS

Application filed December 17, 1928. Serial No. 326,694.

This invention relates to an improved means for preventing axial movement of a rotary member during rotation and more particularly to a means for preventing the separation of two axially-aligned, separable members coupled during rotation, while permitting them to be readily separated or coupled when stationary. The invention produces a mechanism operating centrifugally to provide a lock for preventing axial movement of the rotating member or axial separation of coupled members during rotation.

The invention will be understood by a consideration of the following detailed description of the preferred embodiment when read in conjunction with the accompanying drawings in which:

Figure 1 is a longitudinal sectional view as on line 1—1 of Figure 3, showing two coupled rotary members such as shafts with the improved mechanism of the present invention applied thereto and with portions in dotted lines.

Figure 2 is a similar view showing the disposition of the parts during rotation of the shafts and illustrating portions of the mechanism in dotted lines to show the mode of operation.

Figure 3 is a plan view of the shafts and mechanism.

Figure 4 is a cross sectional view taken as on the lines 4—4 of Figure 1.

Referring more particularly to the drawings, in detail, the invention is illustrated and exemplified as a means for preventing the axial separation of two rotary members or shafts 10 and 11, and locking said members during their rotation. The shaft 10 extends into an axial recess of the shaft 11 and has a square or multi-sided end 12 which enters in a corresponding multi-sided socket of the shaft 11 whereby the shafts 10 and 11 are interlocked and coupled to rotate as a unit. The shaft 10 may, however, be readily removed out of its telescoping relation with the shaft 11 and the two shafts may be axially separated or coupled at will, when they are stationary.

As a means for preventing the axial separation of the shafts during rotation, I provide in the wall of the shaft 11 one or more movable detents 13, which may be rounded somewhat as shown and fit into depressions such as circumferential groove 14 provided on the periphery of shaft 10. When the shaft 10 is inserted in the shaft 11, the detents spring into the groove and tend to prevent the separation of the shafts. The detents are preferably provided with enlarged heads 15 to prevent their falling into the hollow interior of shaft 11 when the shaft 11 is removed therefrom and preferably leaf springs 16 are provided on the exterior of shaft 11 and pivoted as at one end by set screws 17 and act to resiliently urge the detents so that they project into the interior of the shaft 11. The detents thus are resiliently biased into the interior of the shaft 11, so that they provide at all times resilient latching engagement between the shafts 11 and 10, but the springs are not of sufficient strength to prevent the ready removal of the shaft 10 from shaft 11 when desired or prohibit its convenient insertion into said shaft. The detents move back against the action of the springs to permit this insertion or removal of shaft 10 in shaft 11.

In addition to the mechanism thus far described, I provide means acting to lock the detents 13 in the groove 14 of the shaft 10 during rotation of said shafts. In the preferred form shown, this means includes a centrifugally operated element or elements 18 which are pivoted as on pins 19 carried by a collar 20 which rotates with the shaft 11 and is attached to the periphery thereof as by set screw 21 in a rigid manner. I have illustrated in the drawings a mechanism embodying two oppositely disposed centrifugal elements in combination with oppositely disposed detents, as this provides for a dynamic balance of the shafts during rotation. Of course, the number of such parts may be varied in the practise of the invention.

Each centrifugal element is preferably formed with curved portions 22 at its free end which partly extend around the periphery of the shaft 11, fit snugly thereon in the stationary position and provide the weight whereby the element is thrown outwardly, as in Figure 2, during rotation. Each centrifugal element is also provided with depending claws 23 which partly encircle the periphery of the shaft and are placed near the pivoted point 19. The leaf springs 16 are equipped with circumferential portions 24 having projections 25, parts of which are substantially horizontal and parts substantially vertical. When the weights are thrown out, the ends of the claws are brought to a position such as to lock the springs in position, as in Figure 2. The springs cannot move out as the horizontal parts of projections 25 strike the claws and prevent such movement. The vertical parts of the projection act to limit the outward throw of weights. The springs being locked also lock the detents in the groove 14. The more force or pull is applied to shaft 10, the greater is the tendency of the centrifugal elements to move or fly out. The claws are thus urged out and against the vertical or transverse portions of projections, 25, and the more positive becomes the lock. There is consequently no danger of the claws slipping off the horizontal portions of the projections. The result is that upon rotation there is an absolute lock preventing the separation of the shafts. The shafts cannot therefore separate when rotating.

I also provide springs, 26, which may take the form shown best in Figure 3 with portions, 27, coiled around the pivot pin, 19, portion, 28, abutting the collar, 20, and the free ends, 27, extending into apertures 29 of the centrifugal elements. The springs are for the purpose of normally biasing the centrifugal elements in against the periphery of the shaft 11 so that they do not act when the shafts are separated and the shaft 10 may readily be removed from the shaft 11 and conveniently inserted. The unlocked position is seen in Figure 1. The horizontal portions of projections, 25, do not strike the claws when the springs are withdrawn. In the form of the invention disclosed, there is a considerable bearing surface of the shaft, 10, in shaft 11 to sustain any weight applied to shaft, 10.

From the foregoing description, it will be seen that I have provided an exceedingly simple and effective means for enabling two shafts to be coupled in a removable manner and for providing a lock for preventing the separation during rotation. It should be particularly noticed that this lock functions automatically upon rotation of the shafts. When the shafts are not rotating and are still, the lock is ineffective, the shafts may be readily separated. When rotating, the shafts are automatically locked against separation. I thus provide an automatic lock, acting automatically upon rotation to prevent separation of the shafts, and to release them when not rotating.

During rotation, the centrifugal elements act to some extent as governors, as well as locks.

It will be understood that the details of construction herein shown are merely illustrative of the invention and that numerous variations and alterations may be made therein without departing from the spirit of the invention or the scope of the appended claims.

I claim:—

1. The combination with two axially-aligned separable shaft members coupled for simultaneous rotation, of an automatic lock for preventing axial separation of the shaft members during rotation, said lock being inoperative to prevent separation of the members when not rotating.

2. The combination with two axially-aligned, separable shaft members coupled for simultaneous rotation, of an element mounted for centrifugal movement adapted to rotate with said shaft members, and means causing the centrifugal movement of said element to lock the members against separation.

3. The combination with two axially-aligned, separable members coupled for simultaneous rotation, of a spring-biased detent associated with one of the members and adapted for engagement with a depression in the other such as normally to permit ready separation of the members and means automatically operable under influence of rotation of the members for locking the detent in the depression during rotation.

4. The combination with two axially-aligned, separable members coupled for simultaneous rotation, of a spring-biased detent associated with one of the shafts and adapted for engagement with a depression in the other such as normally to permit ready separation of the members, an element mounted for centrifugal movement adapted to rotate with said members, and means causing the centrifugal movement of said element to lock the detent in the depression.

5. The combination with two axially-aligned separable members coupled for simultaneous rotation, of a movable detent associated with one of the members and adapted to engage in a depression in the other member in the coupled position of the members, resilient means acting to urge the detent into the depression, said means being such as normally to permit ready coupling and separation of the members, and means operated by the rotation of the coupled members for locking the detent in the depression.

6. The combination with two axially-aligned, separable members coupled for simultaneous rotation, of a movable detent associated with one of the members and adapted to engage in a depression in the other member in the coupled position of the members, resilient means acting to urge the detent into the depression, said means being such as normally to permit ready coupling and separation of the members, an element mounted for centrifugal movement adapted to rotate with said members, means causing the centrifugal movement of the element to lock the detent in the depression.

7. The combination with a rotary member having an axial recess and a second rotary member adapted to fit removably in the recess and rotatably coupled therein to the first member, of a detent movably positioned in an aperture in the first member and adapted to engage in a depression in the second member in the coupled position of the members, resilient means acting to urge the detent into the depression and such as normally to permit ready insertion of the second member in the first, and means operated by the rotation of the coupled members for locking the detent in the depression.

8. The combination with two axially-aligned, separable members coupled for simultaneous rotation, of a movable detent associated with one of the members and adapted to engage in a depression in the other member, resilient means for urging the detent into the depression, said means having a projecting portion therewith, a centrifugal element for rotation with the members, and means associated with said element for cooperating with the projecting portion whereby the centrifugal movement of said element causes the detent to be locked in the depression.

9. The combination with a pair of rotary members, one of which has a circumferential groove on its periphery, of a detent associated with the other of said members for engagement with the groove, and centrifugal means for locking the detent into the groove.

10. The combination with a rotary member having a depression on its periphery, of a detent for engaging in the depression, resilient means acting to urge the detent in the depression, an element mounted for centrifugal movement, means causing the centrifugal movement of said element to lock the resilient means and detent.

11. The combination with axially-aligned, separable members, of an element mounted for centrifugal movement and for rotation with said members, means biasing said element inward against the members, and means causing the centrifugal movement of said element to lock said members against separation.

12. The combination with axially-aligned, separable shaft members, of an element mounted for centrifugal movement and for rotation with said members, and means for preventing the separation of said members, said means comprising said element mounted for centrifugal movement.

13. The combination with a pair of axially aligned shaft members, one of which has a depression on its periphery, of a detent for engaging in the depression, an element mounted for centrifugal movement, and means causing the centrifugal movement of said element to lock said detent in the depression.

In testimony whereof I have signed my name to this specification this 14th day of December, 1928.

ERNEST F. KAISER.